Jan. 2, 1940.　　　E. C. HASSLER　　　2,185,338
FLUID HANDLING APPARATUS
Filed March 11, 1938　　2 Sheets-Sheet 1
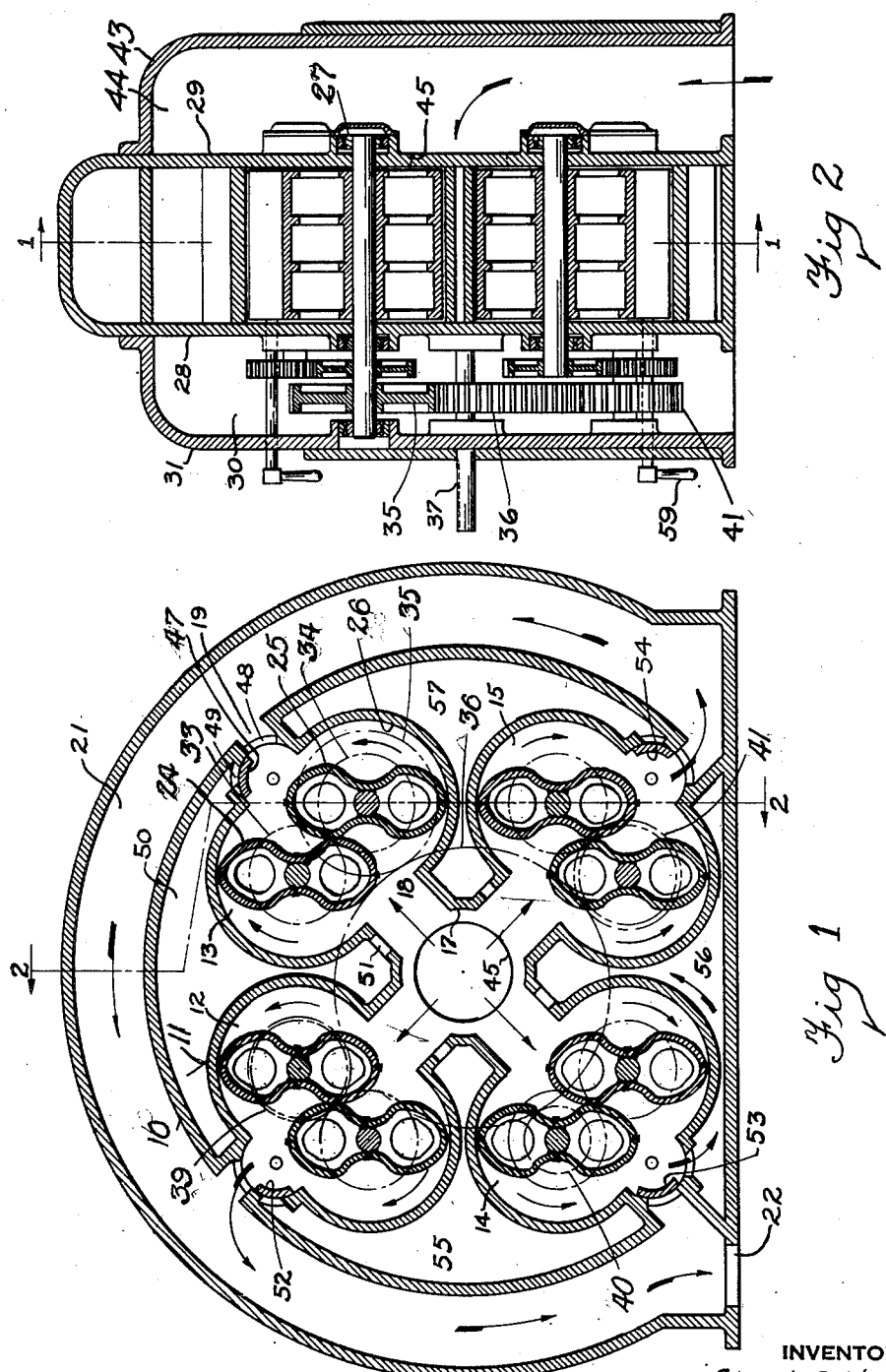
INVENTOR
Ernest C. Hassler
BY
Maréchal & Noé
ATTORNEY

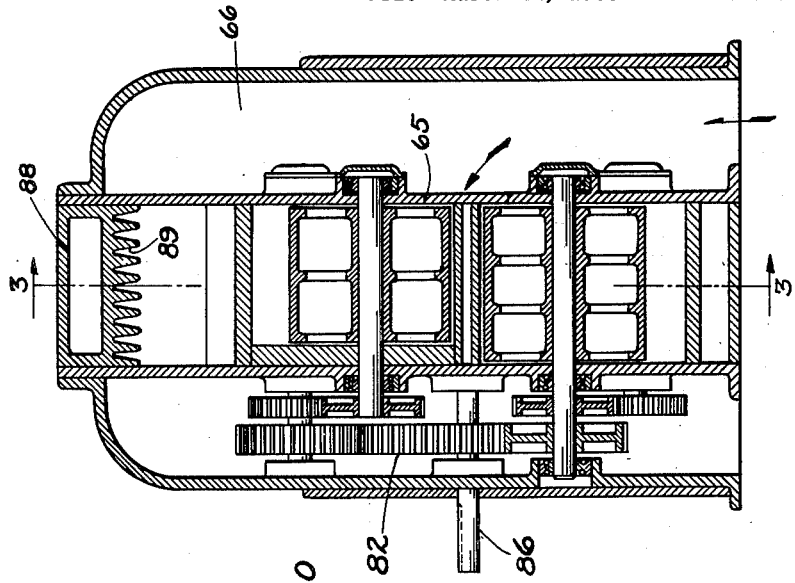
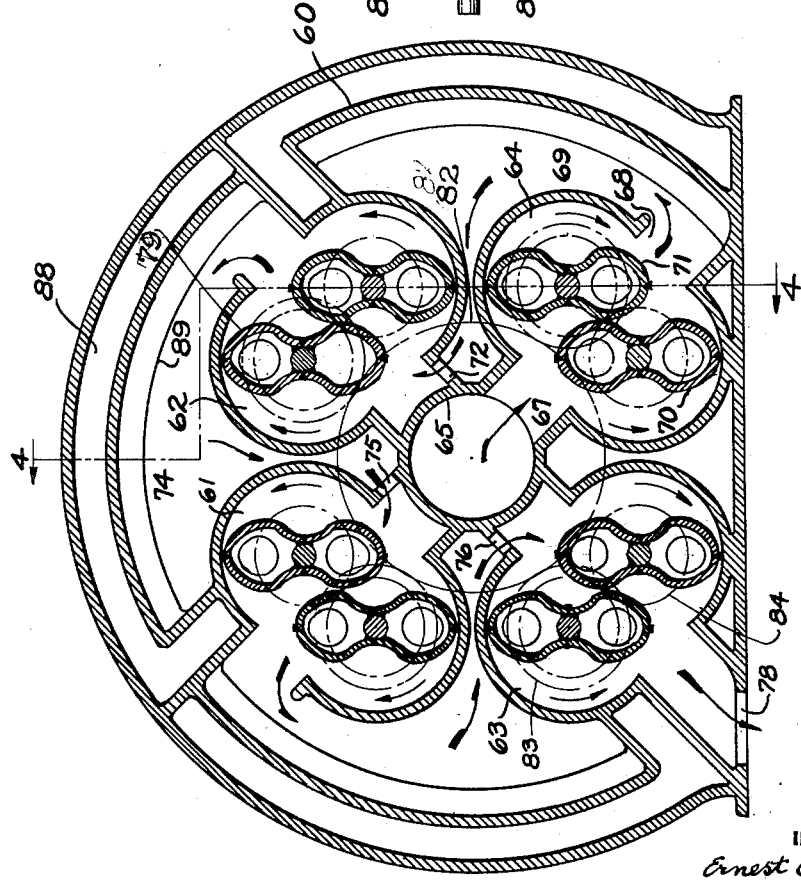

Patented Jan. 2, 1940

2,185,338

UNITED STATES PATENT OFFICE 2,185,338

FLUID HANDLING APPARATUS

Ernest C. Hassler, Connersville, Ind., assignor to Roots-Connersville Blower Corporation, Connersville, Ind., a corporation of Indiana Application March 11, 1938, Serial No. 195,236

9 Claims. (Cl. 103—126)

This invention relates to fluid handling apparatus.

One object of the invention is the provision of fluid handling apparatus having a series of chambers containing rotatable impellers, the chambers being compactly arranged in a casing of small overall length in a radial group and interconnected by suitable supply and discharge passages.

Another object of the invention is the provision of fluid handling apparatus of the character described in which each of the chambers contains a plurality of intermeshing lobed impellers rotatable about axes that are parallel to but spaced from the axes of rotation of the impellers of the other chambers.

Another object of the invention is the provision of fluid handling apparatus providing a series of radially grouped impeller chambers containing rotatable impellers and connected to supply and discharge passages, return passages being provided for connecting one or more of the chambers from outlet to inlet so that the same will be rendered ineffective although the impellers continue operating.

Another object of the invention is the provision of a pump or blower having radially arranged chambers containing rotatable impellers, the chambers having a common central supply passage connected to their several inlet openings and having a common outlet passage connected to the outer ends of all of the impeller chambers.

Another object of the invention is the provision of a pump or blower having radially grouped chambers containing rotatable intermeshing impellers which are interconnected for timed operation at different speeds of rotation in the several chambers.

Other objects and advantages of the invention will be apparent from the following description, the appended claims, and the accompanying drawings, in which:

Fig. 1 is a central vertical section of a fluid handling apparatus embodying the present invention, the section being taken on the line 1—1 of Fig. 2;

Fig. 2 is a section on the line 2—2 of Fig. 1;

Fig. 3 is a vertical section on the line 3—3 of Fig. 4, showing a modified form of construction; and Fig. 4 is a section on the line 4—4 of Fig. 3.

Referring more particularly to the drawings by reference numerals, the fluid handling apparatus, in accordance with the present invention, is one in which there are a plurality of impeller chambers that are compactly grouped in a radial manner about a common center, providing a pump or blower or the like of large capacity but of comparatively short overall length. As herein shown the apparatus is a pump or compressor adapted for handling air or gas, but it will be apparent that the invention is not limited merely to a gas pump.

In Figs. 1 and 2 of the drawings, the gas pump, as shown, comprises a main casing 10 having walls 11 providing a series of impeller chambers 12, 13, 14 and 15 that are grouped radially about a common inlet passage 17. Each impeller chamber has an inlet opening 18 and an outlet opening 19, the inlet openings of the several impeller chambers being arranged inwardly of the chambers and adjacent the inlet passage 17, while the outlet openings of the several chambers are remote from one another and are normally in communication with a common outlet passage 21 extending annularly in the main casing from one chamber outlet to the next, and to the pump outlet opening 22 where the fluid passing the impellers is discharged.

Rotatable impellers operable about axes parallel to and spaced from one another are provided in the several impeller chambers. Thus the impeller chamber 13 contains two lobed intermeshing impellers 24 and 25, each having a pair of lobes adapted to interengage one another continuously, the outer ends of the lobes operating with very small clearance along the cylindrically curved surfaces 26 of the walls of the impeller chamber. The impellers 24 and 25 are fixed to shafts that are rotatably supported in anti-friction bearings 27 in the spaced walls 28 and 29 of the casing.

Beyond the casing wall 28 and adjacent the ends of all of the impeller chambers 12, 13, 14 and 15 is a timing or gear compartment 30 formed between the casing wall 28 and an outer wall 31. Within this gear compartment is suitable gearing interconnecting all of the impellers for proper timed operation. Each impeller shaft projects into the gear compartment 30 and is provided therein with a timing gear, the two timing gears for the impellers 24 and 25 being indicated by the reference numerals 33 and 34. These timing gears 33 and 34 are of the same size and diameter so that the impellers 24 and 25 will operate at the same speed. Fixed to the timing gear 34 is an auxiliary gear 35 which meshes with a drive gear 36 fixed to and carried by a drive shaft 37 that is rotatably supported in the walls 31 and 28 of the casing, preferably adjacent the center of the series of impeller chambers. This main gear 36 is in meshing engagement with the auxiliary gears 39, 40 and 41 which are connected to the timing gears of the impellers that are arranged in the impeller chambers 12, 14 and 15, it being understood that the impellers in the several chambers are of similar cross-sectional form.

Where the impellers in the several impeller chambers are to operate at the same speed of rotation, the shaft 37 is centered with respect to the several impeller chambers and with respect to the inlet passage 17. However in accordance with the construction shown in Figs. 1 and 2, the axis of shaft 37 is somewhat displaced from the center of the inlet opening in order that gear 36 may mesh with the auxiliary gears 35, 39, 40 and 41 that are of different diameters in order that the impellers in the several chambers will operate at different speeds to provide impeller chambers of different capacities. As shown, the impellers in the chamber 14 will operate at a higher speed than the impellers in the other chambers, since the auxiliary gear 40 for that chamber is comparatively small in diameter. The relative speeds of the impellers in the several chambers may be such, for example, as to provide capacities of the order of 600, 500, 400 and 300 cubic feet per minute respectively in the chambers 14, 12, 15 and 13, thus giving a total pump capacity of 1800 cubic feet.

The casing is preferably provided with an outer end wall 43 spaced from the casing wall 29 and providing an inlet or supply compartment 44 in communication with the supply passage 17 which extends laterally from the opening 45 provided in the casing wall 29. The supply compartment 44 may be connected in any suitable manner to the source of gas or other fluid handled. The drive shaft 37 may be connected to any suitable device to be driven, where the apparatus is used as a fluid motor or is connected to a suitable power source where the device is used as a pump or blower.

The outlet openings of the impeller chambers may be connected to the inlet openings and disconnected from the main discharge conduit 21 in order to render one or more of the impeller chambers ineffective although the impellers themselves may continue to operate. The impeller chamber 13 is provided with a valve 47 which is in the position shown in Fig. 1 when that chamber is in operation and effective, and in this position of the valve it is removed from the opening 48 which communicates with the discharge conduit 21, and it closes an opening 49 leading to a return compartment 50. The compartment 50 is closed except for an opening 51 which places it in communication with the inlet opening 18 of the impeller chamber 13. It will thus be apparent that when the valve 47 is rotated from the position shown into position to close the opening 48 it will place the outlet opening of the chamber 13 into direct communication with its inlet opening and provide for recirculation of the fluid from one end of the chamber to the other so that no work will be done on the gas although the impellers continue to rotate.

Similar valves 52, 53 and 54 and similar return compartments 55, 56, and 57 are provided for the other impeller chambers so that each impeller chamber may be rendered inoperative or bypassed under the control of the operator merely by turning the handles 59 of the valves which are accessible from the outside of the casing wall 31. If the desired capacity of the pump at any time is 700 cubic feet per minute, for example, in a pump in which the capacities of the chambers 14, 12, 15 and 13 is respectively 600, 500, 400 and 300 cubic feet, the valve 52 may be moved from the position shown, to render the chamber 12 ineffective, and the valve 53 may be placed in the position indicated so that that chamber is also ineffective and the two chambers 13 and 15 will then supply the required amount of fluid. Any one, two, or three of the impeller chambers may thus be used, or if the maximum capacity of the pump is wanted, all of the impeller chambers can be connected to the common outlet conduit 21.

In accordance with the modified form of construction shown in Figs. 3 and 4, the casing 60 is provided with impeller chambers 61, 62, 63 and 64 grouped radially about a central supply passage 65 leading from the supply compartment 66 and communicating only with the inlet opening 67 of the impeller chamber 64. The outlet opening 68 of this impeller chamber communicates with a compartment 69 which conducts the gas compressed or pumped by the impellers 70 and 71 to the inlet opening 72 of the next impeller chamber 62. The impellers in this chamber 62 have a further compressing or pumping effect on the fluid and supply it at increased pressure to a compartment 74 which communicates with the inlet opening 75 of chamber 61. The output from chamber 61 is supplied to the inlet opening 76 of the chamber 63, and that chamber supplies the fluid at maximum pressure to the pump discharge opening 78. The impellers in the several successive chambers are adapted to successively handle smaller volumetric amounts. Thus the impellers are of successively smaller axial length, the impellers 79 in the chamber 62 being shorter than the impellers 70 and 71 in the chamber 64. Suitable spacing blocks are provided at the ends of the impeller chambers 61 and 63 to make up for the difference in length of the impellers. As shown, the main gear 82 which is in meshing engagement with the auxiliary gears 83 which operate the timing gears 84 of the various impellers is provided on a shaft 86 which is centered with respect to all of the timing gears, which are thus operated at the same speed of rotation.

The pump, in this modification, is shown as provided with a cooling chamber or water jacket 88 in which water may be circulated, suitable cooling fins 89 extending into the compartments provided between adjacent impeller chambers.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Fluid handling apparatus of the character described comprising a casing having a series of chambers more than two in number, a drive shaft rotatably mounted in said casing with its axis at a substantially central axial location respecting all of said chambers and with the chambers grouped on several sides of the axis of said shaft, a pair of lobed intermeshing impellers in each of said chambers rotatable about axes that are parallel to and spaced from the axis of said drive shaft, and means operably interconnecting the impellers of all of said chambers to said drive shaft.

2. Fluid handling apparatus of the character described comprising a casing having a series of chambers more than two in number, a drive shaft rotatably mounted in said casing with its axis at a substantially central axial location respecting all of said chambers and with the chambers grouped on several sides of the axis of said shaft, a pair of double lobed intermeshing impellers in each of said chambers rotatable about axes which are parallel to and spaced from the axis of said drive shaft, said chambers having inlet passages adjacent the center of the series of chambers, and having discharge passages at the radially outer ends of said chambers, a gear on said drive shaft, and gear means operably interconnecting the impellers of each chamber to said gear.

3. Fluid handling apparatus of the character described comprising a casing having a series of chambers more than two in number arranged in a radial group, a drive shaft rotatably mounted in said casing with its axis at a substantially central location respecting all of said chambers, a gear on said shaft, a plurality of lobed intermeshing impellers in each of said chambers rotatable about axes that are parallel to and spaced from the axis of said shaft, a gear fixed respectively to an impeller of each of said chambers and meshing with said first gear, said casing having a compartment adjacent the ends of all of said chambers enclosing said gears.

4. Fluid handling apparatus of the character described comprising a casing, a drive shaft rotatably mounted in said casing, said casing having a series of chambers more than two in number arranged radially outwardly of and annularly grouped about said shaft and on opposite sides thereof, a pair of intermeshing impellers in each of said chambers rotatable about axes which are parallel to and spaced from the axis of said shaft, said chambers having inlet openings at their radially inner ends and outlet openings at their radially outer ends, and gear means operably interconnecting the impellers of each chamber to said shaft, said casing having an inlet passage arranged substantially centrally of said chambers and extending to the inlet opening of at least one of said chambers and having a single discharge passage for the discharge of fluid passing said impellers.

5. Fluid handling apparatus of the character described comprising a casing, a drive shaft rotatably mounted in said casing, said casing having a series of chambers more than two in number arranged radially outwardly of and annularly grouped about said shaft and on opposite sides thereof, a pair of intermeshing impellers in each of said chambers rotatable about axes which are parallel to and spaced from the axis of said shaft, said chambers having inlet openings at their radially inner ends and outlet openings at their radially outer ends, a gear on said shaft, and gear means operably interconnecting the impellers of each chamber to said gear, said casing having an inlet passage arranged substantially centrally of said chambers and extending to the inlet opening of at least one of said chambers and having a single discharge passage for the discharge of fluid passing said impellers and a common gear compartment in said casing adjacent the ends of all of said chambers and enclosing said gear means.

6. Fluid handling apparatus of the character described comprising a casing having a series of chambers more than two in number, a drive shaft rotatably mounted in said casing, said chambers being arranged outwardly beyond and annularly grouped about the axis of said shaft and on different sides thereof, a pair of intermeshing impellers in each of said chambers rotatable about axes which are parallel to and spaced from the axis of said shaft, a common supply passage for said chambers arranged within the series of chambers and at substantially equal distances from each of them, and a common discharge passage for said chambers extending substantially annularly around the series of chambers.

7. Fluid handling apparatus of the character described comprising a casing having a series of chambers more than two in number, a drive shaft rotatably mounted in said casing, said chambers being arranged outwardly beyond and annularly grouped about the axis of said shaft, a pair of intermeshing impellers in said chambers rotatable about axes which are parallel to and spaced from the axis of said shaft, a common supply passage for said chambers arranged substantially centrally within the series of chambers at substantially equal distances from each of them, a common discharge passage for said chambers, auxiliary passages extending from the outlet openings of said chambers to the inlet openings of the same chambers, and valve means for rendering said auxiliary passages effective and ineffective as desired.

8. Fluid handling apparatus of the character described comprising a casing having a series of chambers more than two in number, a drive shaft rotatable in said casing, said chambers being arranged beyond and grouped about the axis of said shaft and on different sides thereof, a plurality of lobed intermeshing impellers in each of said chambers rotatable about axes which are parallel to and spaced from the axis of said shaft, a gear on said shaft, and impeller gears of different ratios for the impellers of the different chambers for operating said impellers at different speeds, said impeller gears having meshing engagement with said first gear.

9. Fluid handling apparatus of the character described comprising a casing having a common supply passage and a series of chambers more than two in number arranged radially about the common supply passage and at substantially equal distances therefrom, a common discharge passage in said casing, a pair of intermeshing lobed impellers rotatably mounted in each of said chambers, and timing means interconnecting the impellers of the different chambers for timed operation at different speeds in the different chambers, and controllable means for bypassing said chambers from outlet to inlet.

ERNEST C. HASSLER.